United States Patent Office 2,828,325
Patented Mar. 25, 1958

2,828,325

PRODUCTION OF BENZONITRILE

George F. Hardy, Drexel Hill, Pa., assignor to Allied Chemical & Dye Corporation, New York, N. Y., a corporation of New York No Drawing. Application June 26, 1956
Serial No. 593,794

5 Claims. (Cl. 260—465)

This invention relates to a process for the production of substantially pure benzonitrile by reacting toluene with ammonia and controlled, low amounts of oxygen at elevated temperatures in the presence of a fluidized vanadium oxide-containing catalyst. This process is an improvement on the process described in United States Patent 2,499,055 which issued February 28, 1950, to John N. Cosby and Michael Erchak, Jr.

According to United States Patent 2,499,055, benzonitrile may be prepared by reacting toluene with ammonia and oxygen at elevated temperatures in the presence of an oxidation catalyst which may contain vanadium oxide. In the process of this patent the representative amount of oxygen used varies from 10 to 40 mols for each mol of toluene.

When a fluidized catalyst bed was used in carrying out the process of United States Patent 2,499,055, the resultant benzonitrile product was relatively pure. However, the best yields of benzonitrile obtained by such procedure were considerably lower than those obtainable by use of a fixed catalyst bed.

I have now made the surprising discovery that by carrying out the reaction of toluene, ammonia and oxygen in the presence of a fluidized vanadium oxide-containing catalyst, while employing controlled, low quantities of oxygen, yields of substantially pure benzonitrile are obtained which are at least equal to and often better than the yields obtained by use of a fixed catalyst bed. In addition, I have found that certain operational advantages hereinafter described result from the combined use of fluidized vanadium oxide-containing catalyst and low quantities of oxygen.

Accordingly, an object of the present invention is to provide an improved process for the production of benzonitrile.

Another object of the invention is to provide a process for the production of substantially pure benzonitrile from toluene, ammonia and controlled, low amounts of oxygen in the presence of a fluidized vanadium oxide-containing catalyst.

Other objects and advantages of the present invention will be apparent to those skilled in the art from the following description and examples.

In accordance with the present invention, substantially pure benzonitrile product is obtained in excellent yield by mixing toluene with air or other oxygen-containing gas and ammonia, the mol ratio of oxygen to toluene gas being in the range of about 2.2 to 6.0:1, preferably about 2.5 to 4.5:1. The mixture is then passed at temperatures ranging from about 300 to 550° C. into contact with a fluidized bed of a vanadium oxide-containing catalyst. A representative set of conditions is as follows: passing a reaction mixture containing about 2 to 6 mols of ammonia and about 2.5 to 4.5 mols of oxygen for every mol of toluene reactant upwardly through a fluidized vanadium oxide-containing catalyst at a temperature of about 375 to 475° C. and at a space velocity of 500 to 3000 cc. of reaction gas (calculated at S. T. P.) per hour per cc. apparent volume of catalyst.

The oxidizing agent used in the present process is oxygen. Although air is the preferred oxidizing agent, the feed mixture can also be made up with oxygen, oxygen-enriched air or oxygen diluted with nitrogen, carbon dioxide, steam or other inert gases. As stated above, I have found that in order to accomplish the objects of the present invention, the mol ratio of oxygen to toluene must be about 2.2 to 6.0:1. Particularly outstanding results have been obtained using a mol ratio of about 2.5 to 4.5:1.

The reaction mixture should contain at least about 1.5 mols of ammonia for each mol of toluene. Especially good yields of benzonitrile are obtained by using about 2 to 6 mols of ammonia for each mol of toluene. In place of ammonia a primary alkyl amine may be employed. The same molecular proportions of the amine as described for ammonia are used.

While the active components of the feed mixture are toluene, ammonia, and oxygen, I have found that by recycling a major portion of the gases leaving the reactor after the benzonitrile product has been removed, the ammonia consumption can be appreciably reduced since a considerable amount of the ammonia feed leaves the reactor unchanged. In addition, using this technique, unattacked toluene can be returned to the reactor and can be utilized again.

Although vanadium oxide catalysts per se may be employed in the process of this invention, I prefer to use catalysts which contain oxides of molybdenum and phosphorus in addition to the vanadium oxide. Further, it is desirable that the catalyst be supported on a support such as activated alumina, alundum, or silica-alumina. A particularly suitable catalyst comprises a mixture of the oxides of vanadium, molybdenum and phosphorus supported on activated alumina.

The catalysts are utilized in finely divided form in the present invention, and generally have a catalyst particle size ranging from about 74 to 300 microns (about 50 to 200 mesh). The catalyst may be maintained in fluidized condition by passing the gaseous reaction mixture upwardly through the catalyst bed at linear velocities of about 0.02 to one foot per second, while maintaining suitable catalyst bed depth of say 2 to 100 inches to maintain the desired space velocity.

While the suitable temperatures may vary somewhat according to the specific catalyst being employed and other operating conditions, generally speaking, the reaction mixture containing the toluene reactant, oxygen and ammonia is contacted with the catalyst at temperatures varying from about 300 to 550° C., preferably from about 375 to 475° C.

The contact time defined as the ratio of the catalyst volume to the flow rate of gas (at reaction conditions) is generally within the range of about 0.1 to 10 seconds.

The initial benzonitrile product formed by the process of this invention usually has a purity of at least about 95%. If desired or required, the initial product may be further purified by simple conventional distillation procedures to produce benzonitrile which is, for all intents and purposes, entirely pure.

By means of the present procedure wherein a fluidized vanadium oxide-containing catalyst is employed and the mol ratio of oxygen to toluene reactant is maintained within the range of about 2.2 to 6.0:1, preferably about 2.5 to 4.5:1, several advantages are obtained. First of all, substantially no tarry by-products are formed which might otherwise contaminate the final product. Also, considerably larger amounts of ammonia can be readily recovered since the present process permits recycling of a portion of ammonia and any unreacted toluene back into the reactor. In addition, in view of the lowered concentration of oxygen, higher concentrations of toluene can be utilized without incurring an explosion hazard. All of these factors contribute to provide a simple and economical process for the production of excellent yields of substantially pure benzonitrile.

My invention will be further illustrated by the following examples.

*Example 1.*—A gaseous mixture of toluene, ammonia, oxygen and nitrogen, in the proportions of 0.51 mol toluene, 1.76 mols ammonia, 1.65 mols oxygen, and 96.1 mols nitrogen, was passed upwardly into contact with a fluidized bed about 2 inches deep of a finely divided catalyst comprising a mixture of the oxides of vanadium, molybdenum, and phosphorous supported on activated alumina at 425° C. and at a space velocity of 2500, which corresponded to a contact time of 0.6 second. Velocity of the gases passing through the finely divided catalyst was 0.1 foot per second (calculated at S. T. P.).

The catalyst had a particle size averaging about 70 to 140 mesh and was prepared in the following manner, parts being by weight: about 2380 parts of concentrated hydrochloric acid were heated with 282 parts of ammonium metavanadate and 70 parts of molybdenum trioxide until solution was complete. To the solution was added about 11.1 parts of a 10% solution of phosphoric acid in water. The solution was mixed with 274.4 parts of activated alumina having a particle size range of 70 to 140 mesh, and the mixture was evaporated to dryness by heating with constant stirring. The resultant catalyst powder was then roasted for 16 hours at about 400° C. in a slow stream of air. The roasted catalyst was sieved to a particle size range of 70 to 140 mesh.

The reaction products were collected in a glass trap cooled in a Dry-Ice bath. The benzonitrile product was a colorless liquid with refractive index close to that of pure benzonitrile. It contained no benzaldehyde, maleic anhydride or toluene detectable by polarographic and infra-red absorption analyses. The yield of benzonitrile was determined by washing the products out of the trap with cyclohexane of "spectrographic" purity and analyzing the solution by ultra-violet absorption measurements. A 79.5 mol percent yield of benzonitrile based on the toluene fed was obtained.

*Examples 2 to 6.*—Benzonitrile was produced by passing a gaseous mixture of toluene, ammonia, oxygen and nitrogen upwardly through a fluidized bed about 2 inches deep of the catalyst of Example 1.

In each of these examples about 2.0 mol percent of ammonia in the feed was used, while the toluene concentration in the feed was about 0.5 mol percent. The space velocity of the gaseous reactants was 2500, which corresponded to a contact time of 0.6 second, and the linear velocity of the reactants was 0.1 foot per second (calculated at S. T. P.). The oxygen to toluene ratio and temperature condition were varied in the examples.

Substantially pure benzonitrile product was recovered by the procedure of Example 1. The following results were obtained:

|  | Oxygen to Toluene, Mol Ratio | Temp., °C. | Yield of Benzonitrile, Mol Percent (based on the toluene fed) |
| --- | --- | --- | --- |
| Example 2 | 2.61 | 425 | 76.6 |
| Example 3 | 2.86 | 425 | 76.9 |
| Example 4 | 3.64 | 400 | 78.5 |
| Example 5 | 3.86 | 400 | 74.2 |
| Example 6 | 4.77 | 375 | 68.0 |

*Examples 7 and 8.*—Benzonitrile was produced by passing a gaseous mixture of toluene, ammonia, oxygen and nitrogen upwardly through a fluidized bed about 2 inches deep of the catalyst of Example 1.

In both of these examples the ammonia concentration in the feed was about 8.0 mol percent, while the toluene concentration in the feed was about 2.0 mol percent. The space velocity of the gaseous reactants was 615, which corresponded to a contact time of 2.5 seconds, and the linear velocity of the gases was 0.03 foot per second (calculated at S. T. P.).

Substantially pure benzonitrile product was recovered by the procedure of Example 1. The following results were obtained:

|  | Oxygen to Toluene, Mol Ratio | Temp., °C. | Yield of Benzonitrile, Mol Percent (based on the toluene fed) |
| --- | --- | --- | --- |
| Example 7 | 2.87 | 425 | 75.5 |
| Example 8 | 2.92 | 413 | 79.5 |

If a concentration of toluene of 2.0 mol percent, as employed in Examples 7 and 8, were used in a comparable reaction carried out with high quantities of oxygen, an explosion hazard would result.

When the reactions of the above examples were carried out under similar operating conditions but using mol ratio of oxygen to toluene higher or lower than the present range of 2.2 to 6.0:1, yields of benzonitrile were significantly lower than obtained during use of this invention. Further, upon carrying out the procedures of the above examples in fixed bed reactors, it was found that the benzonitrile yields decreased with decreasing oxygen content of feed, and, in particular, that oxygen contents substantially in excess of those employed in practice of this invention were necessary to produce reasonably good yields of nitrile product. In practice of the present invention the yields are often, if not usually, substantially greater than those obtained by the fixed bed procedures.

The benzonitrile produced by the process of this invention is of substantial commercial importance for use as a solvent in the plastics industry and for the production of other organic intermediates such as benzoguanamine.

While I have described preferred embodiments for carrying out the process of my invention, it will be apparent that many changes may be made without departing from the spirit of the invention.

I claim:

1. The method of preparing benzonitrile which comprises passing a gaseous mixture comprising toluene, ammonia and oxygen, in the proportions of at least about 1.5 mols of ammonia and about 2.2 to 6.0 mols of oxygen for every mol of toluene, upwardly through a finely divided vanadium oxide-containing catalyst at linear velocity sufficient to effect fluidization of the catalyst, and maintaining said gaseous mixture in contact with the catalyst at a temperature of about 300 to 550° C.

2. The method of preparing benzonitrile which comprises passing a gaseous mixture comprising toluene, ammonia and oxygen, in the proportions of at least about 1.5 mols of ammonia and about 2.5 to 4.5 mols of oxygen per mol of toluene, upwardly through a finely divided vanadium oxide-containing catalyst at linear velocity sufficient to effect fluidization of the catalyst, and maintaining said gaseous mixture in contact with the catalyst at a temperature of about 375 to 475° C.

3. The method of preparing benzonitrile which comprises passing a gaseous mixture comprising toluene, ammonia and oxygen, in the proportions of about 2 to 6 mols of ammonia and about 2.2 to 6.0 mols of oxygen for every mol of toluene, upwardly through a finely divided vanadium oxide-containing catalyst at linear velocity sufficient to effect fluidization of the catalyst, and maintaining said gaseous mixture in contact with the catalyst at a temperature of about 300 to 550° C.

4. The method of preparing benzonitrile which comprises passing a gaseous mixture comprising toluene, ammonia and oxygen, in the proportions of about 2 to 6 mols of ammonia and about 2.5 to 4.5 mols of oxygen for every mol of toluene, upwardly through a finely divided catalyst containing the oxides of vanadium, molybdenum and phosphorus at linear velocity sufficient to effect fluidization of the catalyst, and maintaining said gaseous mixture in contact with the catalyst at a temperature of about 375 to 475° C.

5. The method of preparing benzonitrile which comprises passing a gaseous mixture comprising toluene, ammonia and oxygen, in the proportions of about 2 to 6 mols of ammonia and about 2.5 to 4.5 mols of oxygen for every mol of toluene, upwardly through a finely divided catalyst containing the oxides of vanadium, molybdenum and phosphorus supported on activated alumina at linear velocity sufficient to effect fluidization of the catalyst, and maintaining said gaseous mixture in contact with the catalyst at a temperature of about 375 to 475° C.

References Cited in the file of this patent

UNITED STATES PATENTS

| | | |
|---|---|---|
| 2,499,055 | Cosby et al. | Feb. 28, 1950 |
| 2,540,788 | Klimitas et al. | Feb. 6, 1951 |
| 2,540,789 | Klimitas et al. | Feb. 6, 1951 |

OTHER REFERENCES

Mahan et al.: Abstract of application Ser. No. 120,606, published June 5, 1951, 647 O. G. 311.